R. KRONENBERG.
WHEEL SPOKE STAR.
APPLICATION FILED DEC. 16, 1912.

1,082,087.

Patented Dec. 23, 1913.

Witnesses:

Inventor
R. Kronenberg
per F. Dittmar
Attorney.

UNITED STATES PATENT OFFICE.

RUDOLF KRONENBERG, OF OHLIGS, GERMANY.

WHEEL-SPOKE STAR.

1,082,087.

Specification of Letters Patent. Patented Dec. 23, 1913.

Application filed December 16, 1912. Serial No. 736,971.

*To all whom it may concern:*

Be it known that I, RUDOLF KRONENBERG, subject of the King of Prussia, residing at Ohligs, in the Province of the Rhine, Kingdom of Prussia, German Empire, have invented certain new and useful Improvements in Wheel-Spoke Stars, of which the following is a specification.

This invention relates to a wheel spoke star with stiffening supports secured in a wood ring.

Figure 1:
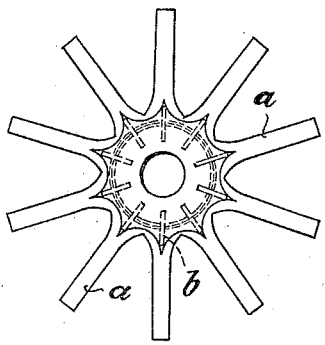
Figure 2:
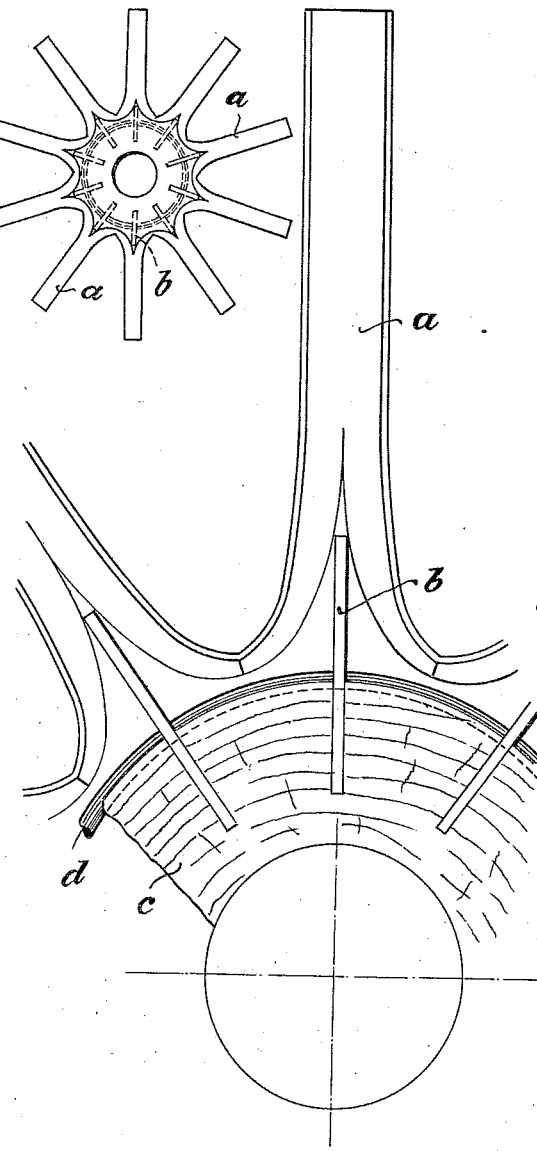
Figure 3:
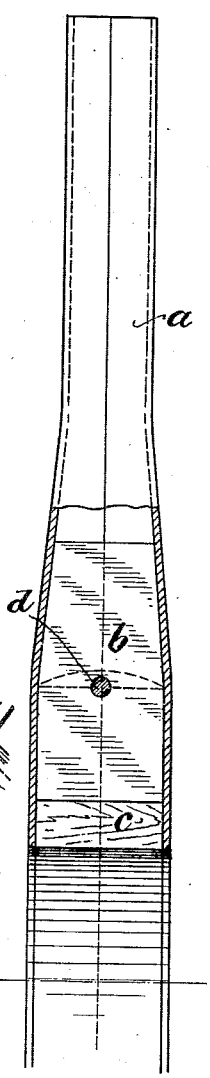

In the case of pressed wheel spoke stars, which as is well known, are composed of two parts, the inner ends of the hollow spokes have proved of insufficient resistance. The power of resistance, however, may be increased by inserting in the inner end of each hollow spoke a stiffening bar which is fixed at a right angle to the plane of the wheel. The fastening of such a stiffening bar to the side walls of the spoke star involves certain difficulties. According to the present invention, the stiffening bars are therefore fixed with their inner ends in a common wood ring. In the drawing, such a star provided with these stiffening bars, is illustrated in Figure 1 on a small scale, whereas in Fig. 2 is shown a section across the wheel axle through a portion of the star and in Fig. 3 an axial section through the same portion with partial elevation.

The spokes are indicated by $a$ and the stiffening radial bars by $b$. Each bar $b$ is inserted with its inner end in the common wood ring $c$. This can also, moreover be wrapped with a wire $d$ as shown in order to afford a still firmer hold for the whole construction.

Having now particularly described and ascertained the nature of my said invention and in what manner the same is to be performed, I declare that what I claim is:—

A spoke star comprising hollow spokes formed in two members, each spoke having outwardly curved inner ends nested together with the corresponding ends of adjacent spokes, a wooden ring between the opposite sides of said spokes and radial bars in said ring projecting outwardly between the curved ends of said spokes.

In testimony, whereof I have signed my name to, this specification in the presence of two subscribing witnesses.

RUDOLF KRONENBERG.

Witnesses:
 LOUIS VANDORY,
 H. J. DUNLAP.

Copies of this patent may be obtained for five cents each, by addressing the "Commissioner of Patents, Washington, D. C."